United States Patent
Wengrovitz

(10) Patent No.: US 7,747,761 B2
(45) Date of Patent: Jun. 29, 2010

(54) SESSION INITIATION PROTOCOL ROUTING USING VOICE COOKIES

(75) Inventor: Michael Wengrovitz, Concord, MA (US)

(73) Assignee: Alcatel Lucent, Paris (FR)

( * ) Notice: Subject to any disclaimer, the term of this patent is extended or adjusted under 35 U.S.C. 154(b) by 190 days.

(21) Appl. No.: 11/131,704

(22) Filed: May 18, 2005

(65) Prior Publication Data

US 2005/0210143 A1    Sep. 22, 2005

Related U.S. Application Data

(62) Division of application No. 10/016,338, filed on Dec. 5, 2001, now abandoned.

(60) Provisional application No. 60/281,885, filed on Apr. 4, 2001.

(51) Int. Cl.
*G06F 15/16* (2006.01)
(52) U.S. Cl. .................. 709/228; 709/203
(58) Field of Classification Search ................ 709/203, 709/217–219, 223–238; 455/414.1–418; 370/493–495
See application file for complete search history.

(56) References Cited

U.S. PATENT DOCUMENTS

| | | | |
|---|---|---|---|
| 5,867,494 A | 2/1999 | Krishnaswamy et al. | |
| 6,154,528 A | 11/2000 | Bennett et al. | |
| 6,226,678 B1 | 5/2001 | Mattaway et al. | |
| 6,330,602 B1 | 12/2001 | Law et al. | |
| 6,434,143 B1 | 8/2002 | Donovan | |
| 6,446,127 B1 | 9/2002 | Schuster et al. | |
| 6,625,141 B1 | 9/2003 | Glitho et al. | |
| 6,636,596 B1 | 10/2003 | Gallant et al. | |
| 6,681,252 B1 | 1/2004 | Schuster et al. | |
| 6,744,759 B1 | 6/2004 | Sidhu et al. | |
| 7,415,537 B1* | 8/2008 | Maes | 709/246 |
| 2002/0076025 A1* | 6/2002 | Liversidge et al. | 379/202.01 |
| 2002/0099814 A1* | 7/2002 | Mastrianni | 709/224 |
| 2002/0120760 A1* | 8/2002 | Kimchi et al. | 709/230 |
| 2002/0141404 A1* | 10/2002 | Wengrovitz | 370/389 |

(Continued)

OTHER PUBLICATIONS

Handley et al, "RFC2543: SIP: Session Initiation Protocol", Mar. 1999, XP015008326.

*Primary Examiner*—Asad M Nawaz
(74) *Attorney, Agent, or Firm*—RG & Associates LLC

(57) ABSTRACT

A system and method for establishing a SIP session between calling and called end-points. A SIP server receives a SIP INVITE request for establishing the SIP session. The SIP INVITE request includes standard routing information in its header. The SIP server receives the SIP INVITE request and responds by transmitting to the calling end-point a HTML link associated with a web server. In rendering the contents of the HTML link, the calling end-point transmits an HTTP request to the web server including voice cookie information. The voice cookie information may include information gathered about the caller such as the caller profile information, transaction information, caller intent information, or recent and past history associated with a web site domain. The web server forwards the voice cookies to the SIP server. The SIP server determines an address of the called end-point as a function of the routing information in the SIP INVITE request and the voice cookie information. The call is then routed to the determined address along with the voice cookies or information derived from the voice cookies. New voice cookies may be written to the web server which transmits these to the calling end-point within an HTTP response.

16 Claims, 7 Drawing Sheets

U.S. PATENT DOCUMENTS

2003/0050918 A1* 3/2003 Pilkington et al. ............. 707/1
2005/0091244 A1* 4/2005 Marcotte .................... 707/100
2006/0250989 A1* 11/2006 Wengrovitz ................. 370/260

* cited by examiner

SESSION INITIATION PROTOCOL ROUTING USING VOICE COOKIES

CROSS-REFERENCE TO RELATED APPLICATION(S)

This application is a divisional of application Ser. No. 10/016,338 filed Dec. 5, 2001, now abandoned.

This application claims the benefit of U.S. provisional application 60/281,885, filed Apr. 4, 2001, the content of which is incorporated herein by reference.

FIELD OF THE INVENTION

This invention relates generally to Internet telephony systems, and more particularly, to intelligent call routing in Internet telephony systems that adhere to session initiation protocol.

BACKGROUND OF INVENTION

Session Initiation Protocol (SIP) is a signaling protocol for creating, modifying, and terminating multimedia sessions, including Internet telephone calls, with one or more SIP-endpoints. Details about the SIP signaling protocol is set forth in Internet Engineering Task Force Request for Comment 2543 entitled "SIP: Session Initiation Protocol," March 1999 (hereinafter referred to as RFC 2543), which is incorporated herein by reference. SIP provides an alternative to PBX- or H.323-signaled telephony.

Although SIP end-points can directly place calls to one another, SIP servers, including proxy and redirect servers, are typically engaged during the call set-up process to route calls. Such call routing includes ascertaining called end-points in response to call establishment messages, referred to as INVITE messages, originated by calling end-points. The INVITE messages are either proxied to ascertained called end-points or to addresses of ascertained called end-points which are returned to the calling end-points.

FIG. 1A is a functional block diagram for establishing a SIP call via a typical proxy SIP server 10. In step 30, the proxy server 10 receives an invitation from a calling end-point 15 in the form of an INVITE request. The INVITE request includes routing information in the "From:", "To:", "Contact:" and other standardized fields within the INVITE message header. The "To:" field of the message header includes a generic SIP URL associated with a called end-point 20.

The proxy server 10 accepts the INVITE request and in step 32, preferably engages a location server 25 for routing the call based on the routing information in the SIP message header. In this regard, the location server 25 retrieves the SIP URL associated with the called end-point to resolve the URL to a more precise address. For example, a call directed to a generic SIP URL such as, for example, "sales@acme.com" may be resolved to a particular person, such as, for example, "bob@ny.acme.com." The retrieved address information is transmitted to the proxy server 10 in step 34.

In step 36, the proxy server 10 issues a second INVITE request to the more precise address. The called end-point 20 receives the second INVITE request and alerts the user of the request by, for example, causing the user's telephone to ring. If the call is answered, the called end-point 20, in step 38, returns a success indication to the proxy server 10 via an OK response. The proxy server 10 forwards the OK response in step 40 to the calling end-point 15. The receipt of the success result is confirmed by the calling end-point 15 by transmitting an ACK request to the proxy server 10 in step 42, which then forwards it to the called end-point 20 in step 44.

FIG. 1B is a functional block diagram of an alternative method for establishing a SIP call using a typical redirect SIP server 47. In step 31, the redirect server 47 accepts the INVITE request and, as the proxy server 10 of FIG. 1A, contacts the location server 25 in step 33 for routing the call based on the routing information in the INVITE message header. The redirect server 47, instead of directly contacting the newly found address received in step 35, returns the address to the calling end-point 15 in step 37. The calling end-point 15 confirms receipt of the address via an ACK request in step 39.

The calling end-point 15 issues a new INVITE request to the address returned by the redirect server 30 in step 41. If the call succeeds, the called end-point 20 transmits an OK response in step 43, and the calling end-point 15, in step 45, completes the handshake with an ACK request.

One limitation in current SIP call routing is the limited information on the caller's intent that may be deduced from the standard routing fields within the INVITE message headers. In order to gather additional call intent information for routing a call, conventional approaches often make use of interactive voice response (IVR) systems, whereby the caller is prompted for and provides additional information on the caller's intent through selection of dual tone multi-frequency (DTMF) digits. For example, a person making a call to a general address may be asked to enter account information and select a particular department, such as customer service, sales, or marketing department, to which the call is then appropriately routed. Use of IVR systems to ascertain additional caller intent information is very cumbersome and inconvenient for the caller, and requires additional message exchanges and database lookups, which translate into slow call setup times.

Newer systems may employ voice recognition techniques in response to IVR prompts to deduce the caller's intent. However, such voice recognition systems are also cumbersome and inconvenient for the caller, subject to error, and also yield slow call setup times.

Accordingly, there is a need for a more efficient system and method for ascertaining caller intent information for intelligently routing an incoming call.

SUMMARY OF THE INVENTION

The current invention is directed to a system and method for intelligently routing SIP sessions, also referred to as SIP calls, using information gathered from the caller. In one embodiment, the invention is directed to a method for establishing a SIP session between a first device and a second device, where the method includes the steps of receiving a call establishment message from the first device, retrieving caller intent information from a data store on the first device in response to the call establishment message, using the caller intent information to determine an address of the second device, and using the address for routing the SIP session to the second device.

In another embodiment, the invention is directed to a method for establishing a SIP session between a first device and a second device, where the method includes the steps of receiving a call establishment message from the first device for establishing the SIP session, retrieving information stored in the first device in response to the call establishment message, determining an address of the second device based on the retrieved information, and using the address for routing the SIP session to the second device.

In a further embodiment, the invention is directed to a method for establishing a SIP session between a first device and a second device, where the method includes the steps of receiving a call establishment message from the first device for establishing the SIP session, transmitting an address of a server to the first device for causing retrieval of information stored in the first device, receiving the retrieved information from the first device, determining an address of the second device based on the retrieved information, and using the address for routing the SIP session to the second device.

In another embodiment, the invention is directed to a communication system adhering to a SIP protocol, where the system includes a first device, a second device, and a server operative between the first device and the second device. The first device transmits to the server a call establishment message for establishing a SIP session. The server receives the call establishment message and in response, causes retrieval of information stored in the first device. The server further determines an address of the second device based on the retrieved information and uses the address for routing the SIP session to the second device.

In another embodiment, the invention is directed to a first server in a communication network establishing a SIP session between a first device and a second device, the first server coupled to a second server, characterized in that the first server receives a call establishment message from the first device and in response, transmits an address of the second server to the first device for causing retrieval of information stored in the first device. The server further determines an address of the second device based on the retrieved information and uses the address for routing the SIP session to the second device.

It should be appreciated, therefore, that the present invention allows a more intelligent determination of a callee address than when only using standard routing information. The additional information retrieved from the calling device yields a better understanding of the user's profile, habits, call intent and the like, for a better determination of a most appropriate callee to handle the call.

BRIEF DESCRIPTION OF THE DRAWINGS

These and other features, aspects and advantages of the present invention will be more fully understood when considered with respect to the following detailed description, appended claims, and accompanying drawings where:

DETAILED DESCRIPTION OF THE SPECIFIC EMBODIMENTS

Figure 2:
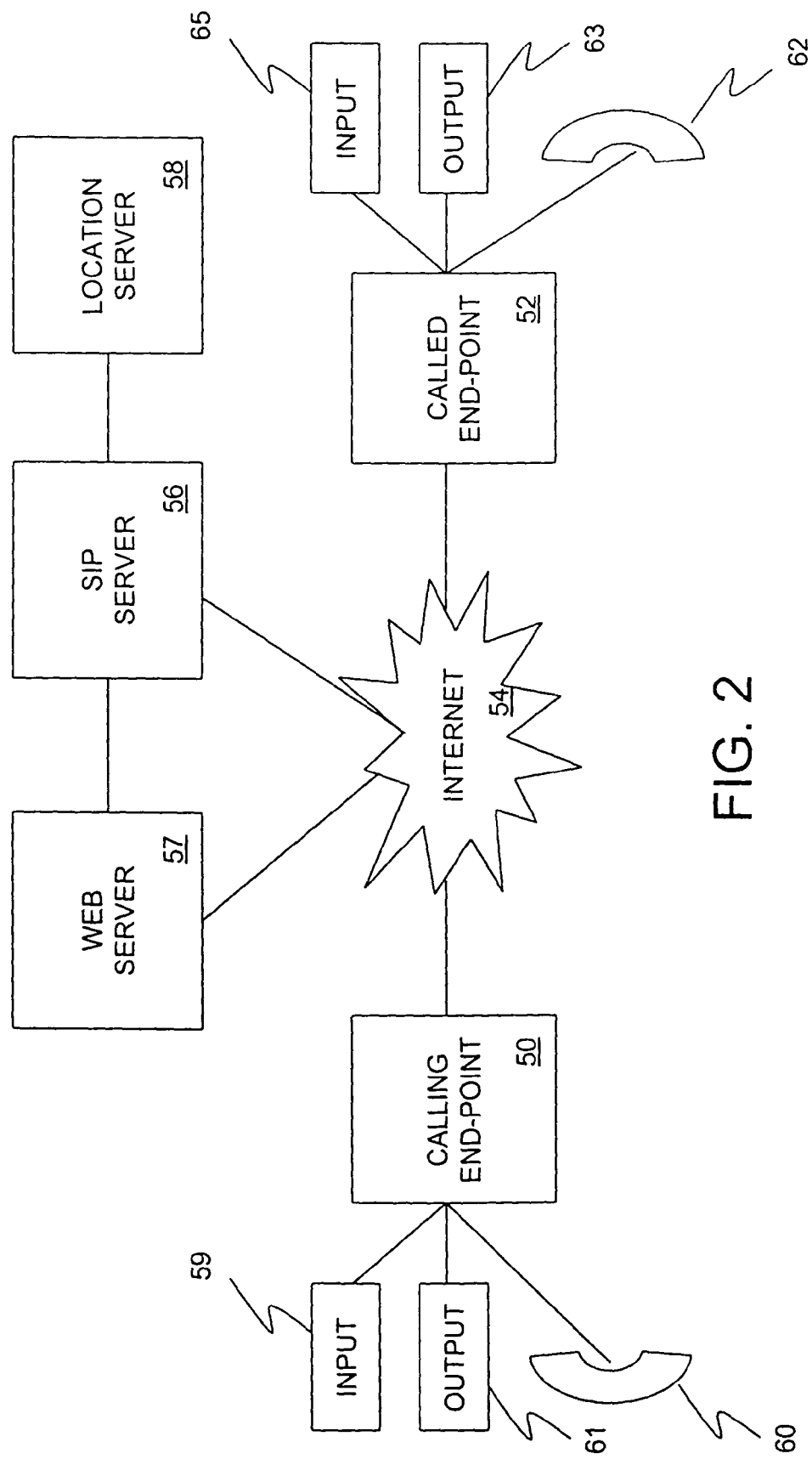
FIG. 2 is a schematic block diagram of a communication system adhering to a session initiation protocol according to one embodiment of the invention.

FIG. 2 is a schematic block diagram of a communication system adhering to a session initiation protocol (SIP) according to one embodiment of the invention. The system includes a calling end-point 50 initiating a call that is directed to a called end-point 52 over a wide area network, such as, for example, a public internet 54. The calling end-point 50, called end-point 52, and internet 54 preferably adhere to the SIP signaling protocol set forth in RFC 2543.

The calling and called end-points 50, 52 are preferably SIP-enabled telephones, hand phones, personal computers, switches, routers, and/or the like. Preferably, each calling and called end-point is associated with an input device 59, 65 receiving input data, such as, for example, an input cable, a keyboard, a keypad, or the like. Each calling and called end-point is further associated with an output device 61, 63 presenting output data, such as, for example, an output cable, a display, or the like. The calling and called end-points 50, 52 are preferably also associated with handsets 60, 62 receiving and transmitting voice data and allowing a voice conversation between a caller and callee.

Figure 1A:
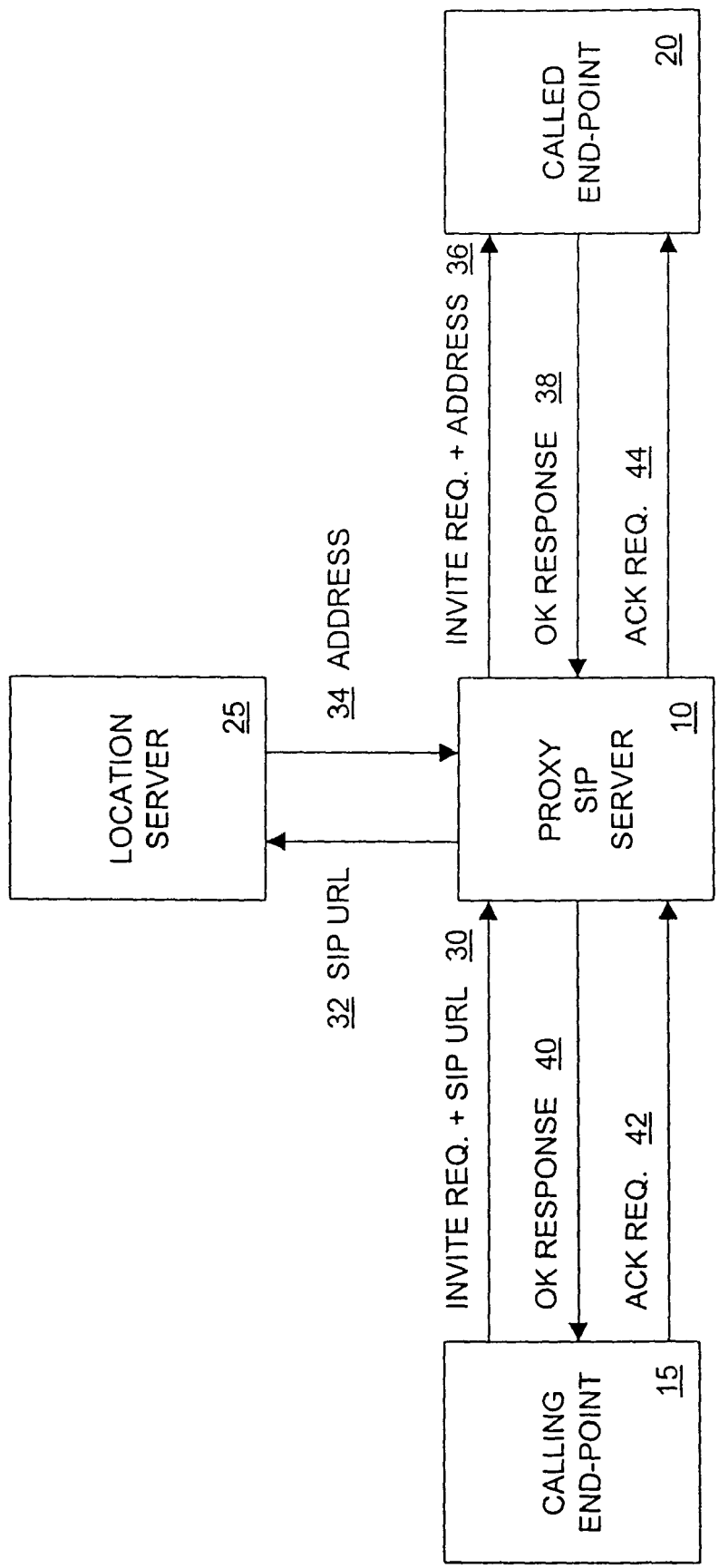
FIG. 1A is a functional block diagram of establishing a SIP call using a typical proxy SIP server.
Figure 1B:
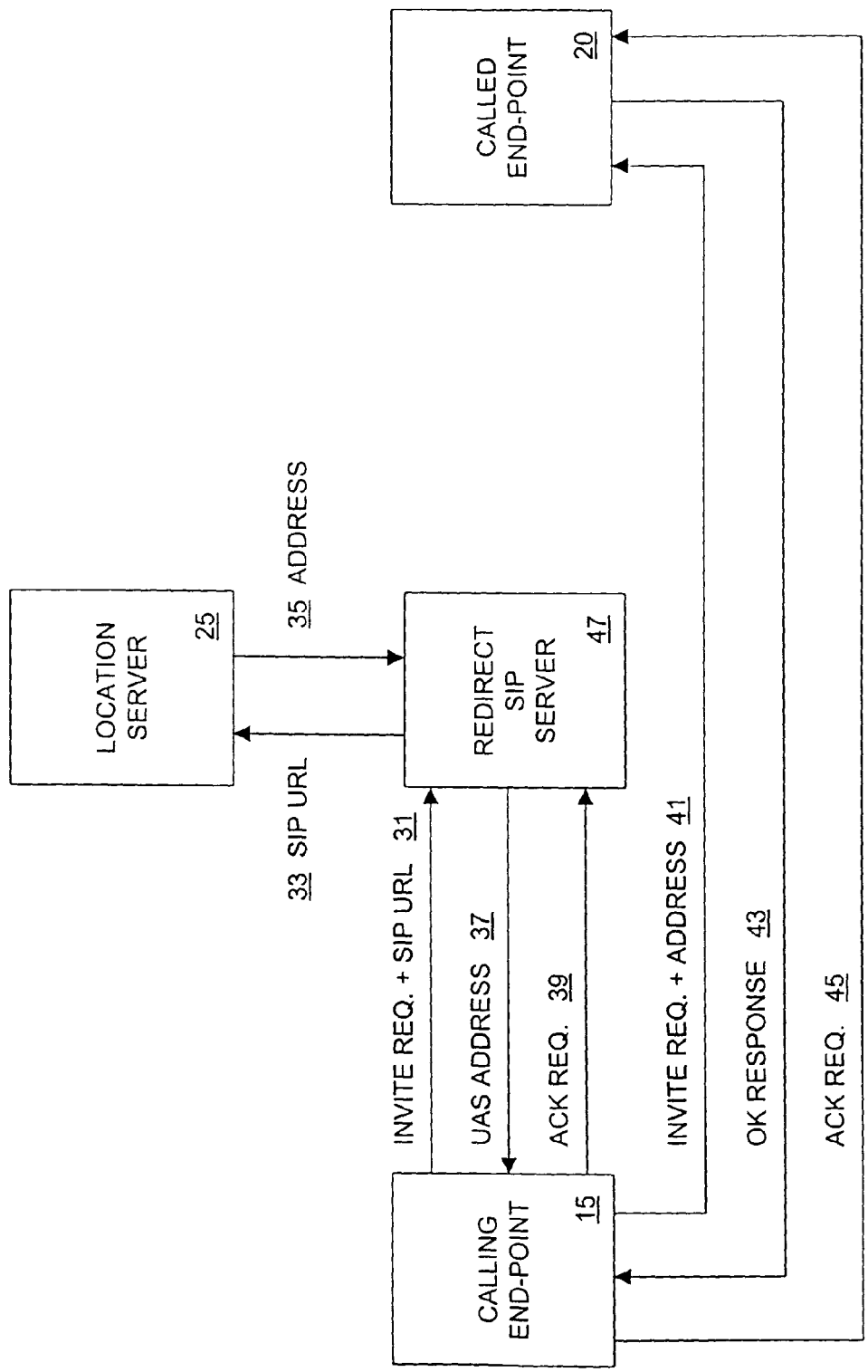
FIG. 1B is a functional block diagram of an alternative method for establishing a SIP call using a typical redirect SIP server.

The communication system of FIG. 2 further includes a SIP server 56 preferably routing SIP calls between the calling and called end-points 50, 52. The SIP server 56 is preferably a proxy server or a redirect server similar to the proxy and redirect servers 10, 47 of FIGS. 1A-1B. The SIP server 56, however, is enhanced with the capability of using information associated with the caller retrieved from the calling end-point, hereinafter referred to as a voice cookie information, for a better understanding of the user's profile, habits, calling intent and the like. The SIP server 56 preferably routes the SIP call based on the retrieved voice cookie information.

The SIP server 56 is preferably coupled to a location server 58 and a web server 57. The location server contains the location information used for routing the SIP calls. The location server may be similar to the location server 25 of FIGS. 1A-1B.

The web server 57 is preferably a hypertext transfer protocol (HTTP) server capable of receiving and processing HTTP requests from the calling end-point 50. According to one embodiment, the web server 57 shares a same domain as the SIP server 56. The web server 57 includes the capability of receiving voice cookies transmitted within HTTP requests, and forwarding the cookies to the SIP server 56. The web server 57 also includes the capability of receiving new voice cookies from the SIP server and writing the cookies within HTTP responses to the calling end-point.

According to one embodiment of the invention, the web server 57, SIP server 56, and/or location server 58 reside in a single machine. In another embodiment, the servers reside in two or three separate machines coupled to each other over a local area network, private wide area network, or the public internet 54.

In general terms, the SIP server 56 causes the retrieval of voice cookies from the calling end-point for more intelligently routing an incoming SIP call. Voice cookies may include, by way of example, a name, an address, a phone number, an email address, an account number, a transaction history, a billing history, a department name or selection, an agent preference or selection, a language preference or selection, a product preference or selection, or any other information that may be used to route a call, such as, for example, caller intent information typically gathered via an interactive voice response system, user profile information, user habit information, or information contained in traditional browser cookies associated with a web site domain.

Voice cookie information is preferably stored in the calling end-point according to various mechanisms. For instance, the cookie may be deposited from a user visiting a particular web site or a particular page on a web site, such as, for example, a registration page. The voice cookie information may indicate how often the particular caller has visited the web site, current items in a shopping cart, or a certain dollar amount of goods purchased from the web site. In this scenario, the voice cookies may be identical to browser cookies, allowing the SIP server 56 to route calls based on user recent and past activities on the web site.

Additional voice cookie information may be written by the SIP server 56 or calling end-point 50 during or after a SIP call. The additional voice cookie information may, for instance, update transaction history information, call history information, called agent information, and/or the like.

Figure 3:
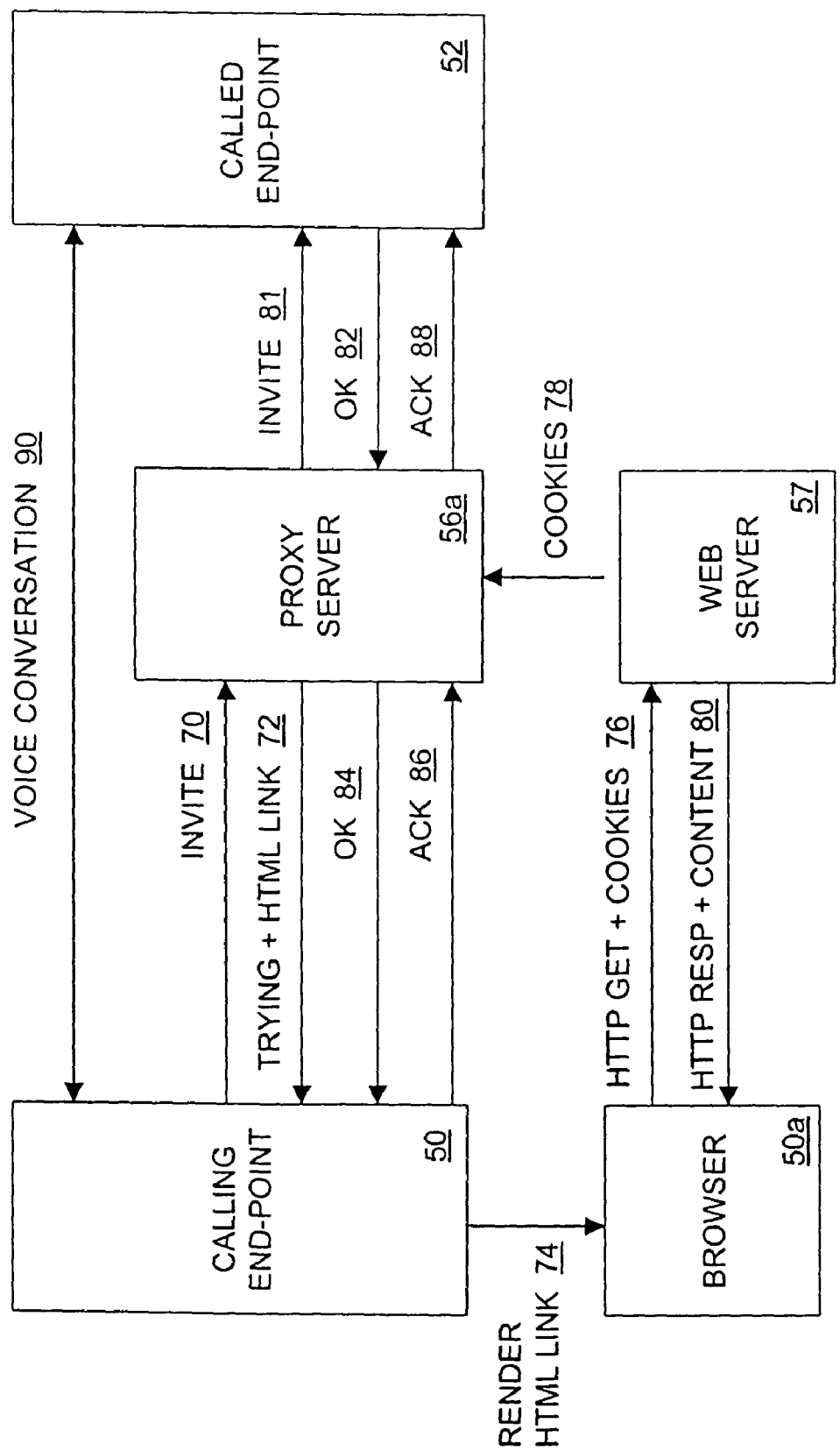
FIG. 3 is a functional block diagram for establishing a SIP call based on voice cookie information using a proxy SIP server.

FIG. 3 is a functional block diagram for establishing a SIP call based on voice cookie information where the SIP server 56 is a proxy server 56a. In step 70, the proxy server 56a receives an INVITE message from the calling end-point 50. The INVITE request preferably includes standard routing information in the "From:", "To:", "Contact:" and other fields within the INVITE message header.

The proxy server 10 accepts the INVITE message and in step 72, preferably transmits a TRYING message to indicate to the calling end-point that an action is being taken on behalf of the call, but that the callee has not yet been located. Along with the trying message, the proxy server 56a preferably also transmits a hypertext markup language (HTML) link associated with the web server 57 for retrieving associated voice cookies. Preferably, the HTML link is transmitted in a SIP message body portion of the TRYING message.

In step 74, the calling end-point invokes a browser 50a in attempting to render the HTML link. In doing so, the browser 50a issues, in step 76, a HTTP request to the web server 57 along with all cookies associated with the URL of the HTML link. In step 78, the web server 57 forwards the received cookies to the requesting proxy server 56a. In step 80, the web server 57 optionally transmits HTML content for purposes of being rendered by the browser 50a.

The transfer of voice cookie information preferably occurs in a manner that is transparent to the caller. In addition, suitable digital encryption and signature techniques conventional in the art may be employed to assure authorized access to the voice cookies, and to further ensure that the voice cookies are authentic.

The proxy server 56a uses the retrieved voice cookie information along with routing information contained in the INVITE message to determine a most correct address to which to route the call. For example, if the call is directed to a customer sales department and the voice cookie information contains the name of a last customer sales representative who talked with the caller, the proxy server 56a may automatically route the call to such customer sales representative instead of any available representative.

In step 81, the proxy server 56a issues a second INVITE message to the ascertained address. The retrieved voice cookie information may also be provided to the calling end-point in the body of the INVITE message. This may be desirable, for example, to facilitate discussions between a customer representative at the called end-point 52 and a caller at the calling end-point 50 who places a call about merchandise being purchased at a particular web site. The merchandise information may be stored as voice cookie information in the calling end-point as the user navigates the web site and places items into an electronic shopping cart.

The called end-point 52 receives the second INVITE message and alerts the user of the request by, for example, causing the user's telephone to ring. If the call is answered, the called end-point 52, in step 82, returns a success indication to the proxy server 56a via an OK response. The proxy server 56a in turn forwards the OK response in step 84 to the calling end-point 50. The receipt of the success result is confirmed by the calling end-point 50 by transmitting an ACK request to the proxy server 56a in step 86, which then forwards it to the called end-point 52 in step 88. Voice conversation between users of the calling and called end-points 50, 52 ensues in step 90 via their respective handsets 60, 62.

Figure 4:
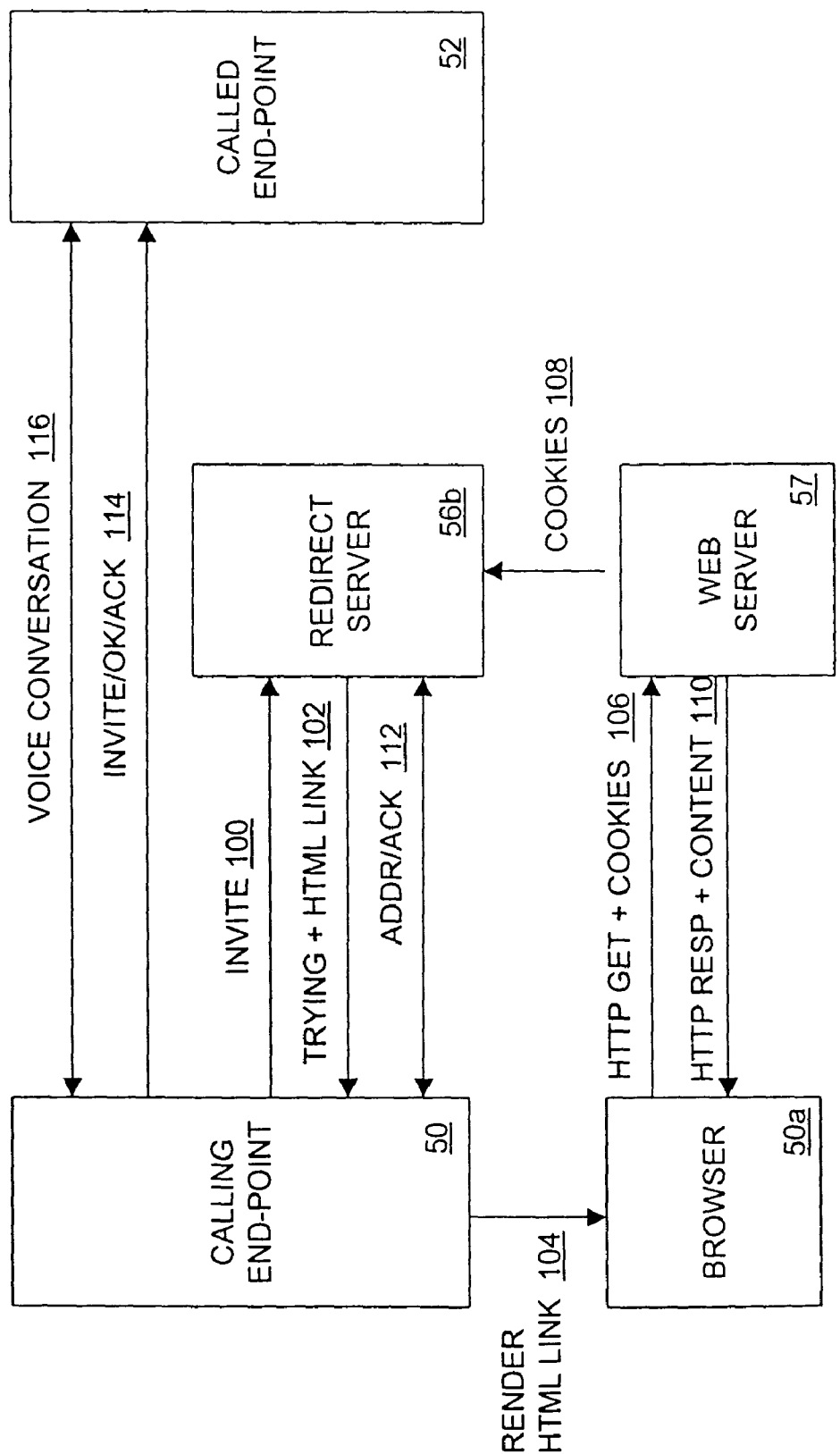
FIG. 4 is a functional block diagram for establishing a SIP call based on voice cookie information using a redirect SIP server.

FIG. 4 is a functional block diagram for establishing a SIP call according to another embodiment of the invention where the SIP server 56 is a redirect server 56b. In step 100, the redirect server 56b accepts the INVITE message and, as the proxy server 56a of FIG. 3, transmits a TRYING message with an HTML link in step 102. In step 104, the browser 50a attempts to render the HTML link and transmits a request to the web server 57 in step 106 with stored voice cookies. The voice cookies are transmitted to the redirect server in step 108 for use in determining a most correct address to which to route the call. The web server 57 may further transmit HTML content for display by the browser 110.

In step 112, the redirect server 56b returns the address to the calling end-point 50 which confirms receipt of the address via an ACK request. In step 114, the calling end-point 50 issues a new INVITE request to the address returned by the redirect server 56b. If the call succeeds, the called end-point 52 transmits an OK response, and the calling end-point 50 completes the handshake with an ACK request. Voice conversation between the users of the calling and called end-points 50, 52 ensues in step 116 via their respective handsets 60, 62.

Although in the embodiments illustrated in FIGS. 3 and 4, the HTML link 102 is deemed to be transmitted in a response SIP message from the proxy or redirect SIP server 56a, 56b, a person skilled in the art should recognize that other mechanisms known in the art may also be utilized to transmit the link. For example, the link may be transmitted by the SIP server within an instant message. According to this example, the instance message may instruct the caller to select the link to continue with the call. Actuating the link may cause the transmission of a HTTP request to the web server along with the stored voice cookies.

Figure 5:
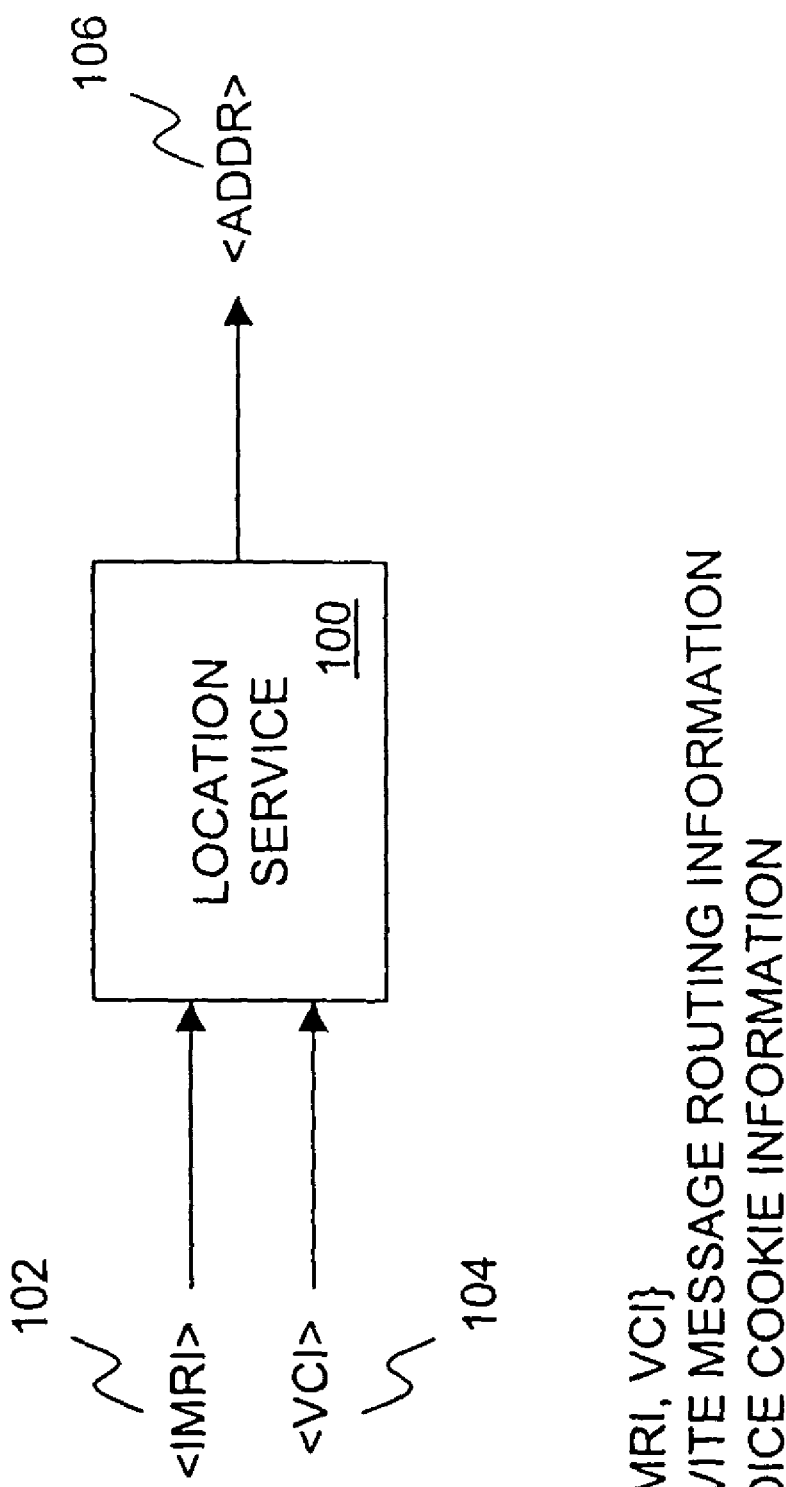
FIG. 5 is a functional block diagram for determining address information based on pulled voice cookie information.

FIG. 5 is a functional block diagram for determining an address of a called end-point according to one embodiment of the invention. A location service 100 preferably receives an INVITE message information 102 from a calling end-point. The information preferably contains a generic SIP URL of the called end-point. The location server 100 further receives voice cookie information 104 forwarded by the web server 57. The location server 100 produces an address 106 as a function of the routing information and voice cookie information. The address may be, for instance, a specific IP address.

The location service is preferably a software module residing in the proxy server 56a or redirect server 56b. Alternatively, the location service may be a software module residing in the location server 58 coupled to either the proxy or redirect server. A person skilled in the art should recognize, however, that the location service may be implemented in firmware, hardware, or in any combination of software, firmware, and/or hardware.

Figure 6:
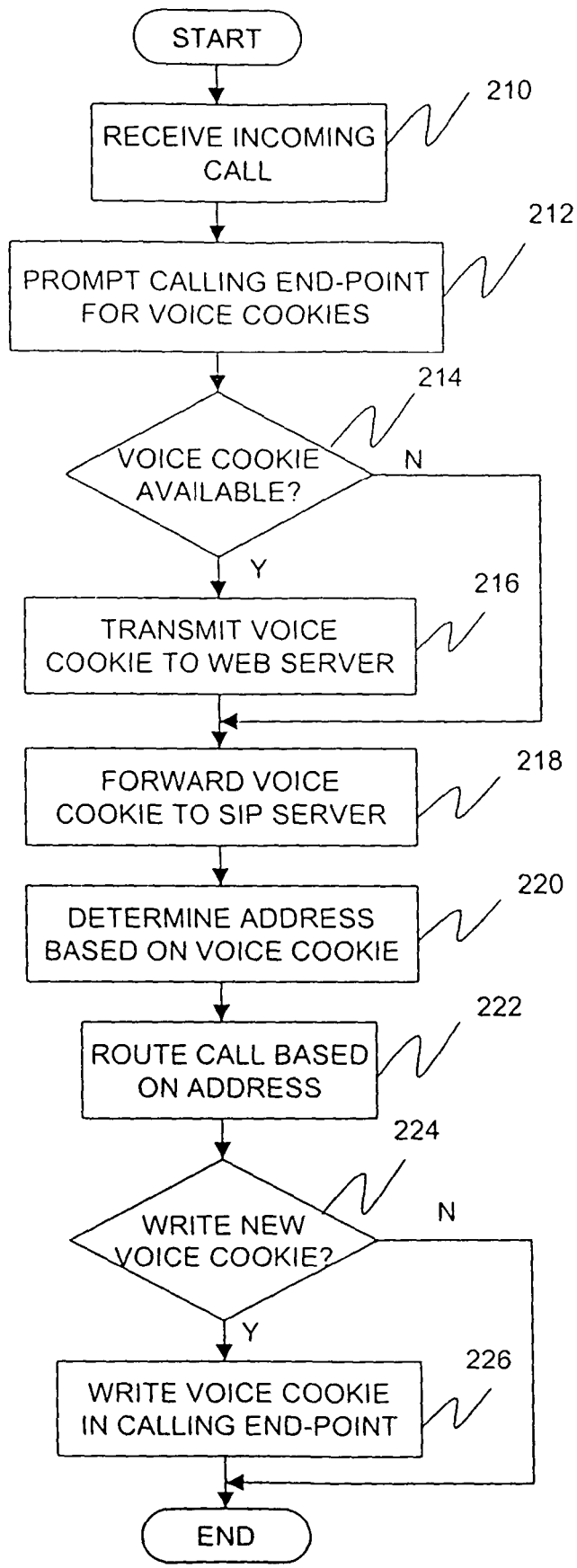
FIG. 6 is a flow diagram of a process for SIP call setup according to one embodiment of the invention.

FIG. 6 is a flow diagram of a process for SIP call setup according to one embodiment of the invention. The process starts, and in step 210, the SIP server 56 receives an incoming SIP call including a call establishment message in the form of a SIP INVITE from the calling end-point 50. The SIP server 56 may, in one example, be located at "sipacme.com." The SIP INVITE message includes standard routing information in its header. In step 212, the SIP server 56 causes retrieval of stored voice cookies in the calling end-point for more intelligently routing the call. In this regard, the SIP server 56 transmits an HTML link to the calling end-point 50 as either part of a SIP response message or in a stand-alone communication, such as, for example, in an instant message. The HTML link may be, for example, "a.acme.com."

In step 214, the browser resident at the calling end-point determines if voice cookies associated with the provided domain name reside in the calling end-point. In this regard, the browser may search for a particular file-name, file extension, or the like, where voice cookie information is known to be stored. In the given example, the browser may search a cookie directory for all voice cookies associated with the domain ".acme.com."

If voice cookies associated with the domain are present, the voice cookies are transmitted by the calling end-point to the web server in step 216, within the calling end-point's HTTP request for rendering the HTML link. In step 218, the web server 57 forwards the received voice cookies to the to the SIP server.

In step 220, the SIP server 56 determines an address of the called end-point as a function of the routing information in the SIP INVITE message and the voice cookie information. For example, the voice cookie information may indicate a particular department or agent to which to route the call. In step 222, the SIP server routes the call to a called end-point based on the determined address.

In step 224, a determination is made as to whether new voice cookie information is to be written to the calling end-point. If the answer is YES, the new voice cookie information is written into the calling end-point, in step 226, for use in routing future calls. In this regard, the SIP server 56 transmits new or updated values of the voice cookies to the web server 57 which sets the values in its HTTP response to the calling end-point.

According to one embodiment of the invention, the SIP server 56 may further initiate an outbound call to a SIP end-point, or to a SIP-to-public switched telephone network (PSTN) gateway connected through the PSTN to a conventional non-SIP telephone, based on browser activity at a particular web site such as, for example, "acme.com". The particular browser activity may be, for example, an abandoned shopping cart.

In response to the detected browser activity, the web site delivers to the end-point a HTML link 74 associated with the web server 57 such as, for example, "a.acme.com." In rendering the HTML link, the end-point transmits a HTTP request with its voice cookies to the web server 57. The voice cookies may be associated, for example, to recent user activity on the web site. The web server 57 transfers the cookies to the SIP server 56 which then initiates an outbound call to the user as well as to a suitable agent. According to one embodiment of the invention, the SIP server 56 transmits all or part of the received voice cookies to the agent in initiating the outbound call.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A method for establishing a session initiation protocol (SIP) session between a first device and a second device by a SIP server between the first device and the second device, the method comprising the steps of:

receiving, via the SIP server, a call establishment message from the first device for establishing the SIP session;

transmitting, via the SIP server and the first device, the call establishment message with a hypertext transfer mark-up language (HTML) link to a web server, via a web browser, to retrieve voice cookie information, wherein the first device invokes the web browser to render the HTML link;

retrieving, via the first device, voice cookie information stored in the first device in response to the call establishment message;

determining, via the SIP server, an address of the second device based on the retrieved voice cookie information;

using, via the SIP server, the address and the retrieved voice cookie information for routing the SIP session to the second device; and transmitting to the first device, via the SIP server, additional voice cookie information, which is new and updated with respect to the voice cookie information stored in the first device to be written into the first device for use in routing subsequent SIP sessions initiated by the first device.

2. The method of claim 1, wherein the voice cookie information includes information gathered about a user of the first device.

3. The method of claim 2, wherein the information includes voice cookie information from interactions of the user with a particular web site.

4. The method of claim 1, wherein the step of retrieving the voice cookie information comprises the step of retrieving the voice cookie information by the first device for transmitting to a web server.

5. The method of claim 1 further comprising the step of writing new voice cookie information in the first device for use in routing future SIP sessions initiated by the first device.

6. The method of claim 1 further comprising the step of transmitting the retrieved voice cookie information to the second device.

7. A method for establishing a session initiation protocol (SIP) session between a first device and a second device by a SIP server and a web server between the first device and the second device, the method comprising the steps of:

receiving, via the SIP server, a call establishment message from the first device for establishing the SIP session;

transmitting, via the SIP server and the first device, the call establishment message along with a hypertext transfer mark-up language (HTML) link to a web server, via a web browser, to retrieve voice cookie information, wherein the first device invokes the web browser to render the HTML link;

transmitting, via the SIP server, an address of the web server to the first device for causing, via the first device, retrieval of voice cookie information stored in the first device;

via the web server designated by the address, receiving the retrieved voice cookie information from the first device;

determining, via the SIP server, an address of the second device based on the retrieved voice cookie information;

using the address and the retrieved voice cookie information for routing the SIP session to the second device; and transmitting to the first device, via the SIP server, additional voice cookie information, which is new and updated with respect to the voice cookie information stored in the first device to be written into the first device for use in routing subsequent SIP sessions initiated by the first device.

8. The method of claim 7, wherein the voice cookie information includes information gathered about a user of the first device.

9. The method of claim 8, wherein the voice cookie information includes interactions of the user with a particular web site.

10. The method of claim 7 further comprising the step of writing new voice cookie information in the first device for use in routing future SIP sessions initiated by the first device.

11. The method of claim 7, wherein the address is associated with a hypertext markup language link.

12. The method of claim 7, wherein the address is transmitted in a response SIP message to the first device.

13. The method of claim 7 further comprising the step of transmitting the retrieved information to the second device.

14. A method for establishing a session initiation protocol (SIP) session between a first device and a second device by a SIP server, the method comprising the steps of:

receiving, via the SIP server, a call establishment message from the first device;

transmitting, via SIP server and the first device, the call establishment message along with a hypertext transfer mark-up language (HTML) link to a web server, via a web browser, to retrieve voice cookie information, wherein the first device invokes the web browser to render the HTML link;

retrieving, via the first device, caller intent information from a data store on the first device in response to the call establishment message, wherein the caller intent information includes the voice cookie information;

using, via the SIP server, the caller intent information and the retrieved voice cookie information to determine an address of the second device;

using, via the SIP server, the address and the retrieved voice cookie information for routing the SIP session to the second device; and transmitting to the first device, via the SIP server, additional voice cookie information, which is new and updated with respect to the voice cookie information stored in the first device to be written into the first device for use in routing subsequent SIP sessions initiated by the first device.

15. The method of claim 14, wherein the caller intent information includes caller data.

16. The method of claim 14 further comprising the step of writing new caller intent information in the data store for use in routing future SIP sessions initiated by the first device.

* * * * *